(12) United States Patent
Acks et al.

(10) Patent No.: US 11,834,155 B2
(45) Date of Patent: Dec. 5, 2023

(54) LANDING GEAR WHEEL RETENTION DEVICE

(71) Applicant: GOODRICH CORPORATION, Charlotte, NC (US)

(72) Inventors: James Acks, Medina, OH (US); Samuel J. Reiss, Dallas, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 276 days.

(21) Appl. No.: 17/210,273

(22) Filed: Mar. 23, 2021

(65) Prior Publication Data
US 2022/0306288 A1    Sep. 29, 2022

(51) Int. Cl.
*B60B 27/06* (2006.01)
*B64C 25/36* (2006.01)

(52) U.S. Cl.
CPC .......... *B64C 25/36* (2013.01); *B60B 27/065* (2013.01)

(58) Field of Classification Search
CPC ............................. B60B 27/065; B64C 25/36
See application file for complete search history.

(56) References Cited

U.S. PATENT DOCUMENTS

| | | | |
|---|---|---|---|
| 2,282,359 A * | 5/1942 | Hollerith | F16D 55/06 301/6.2 |
| 3,273,382 A * | 9/1966 | Fonash | G01G 19/07 177/136 |
| 3,871,709 A * | 3/1975 | Eaton | B64C 25/36 301/6.2 |
| 3,924,898 A * | 12/1975 | Kain | B62J 23/00 301/37.26 |
| 4,424,981 A * | 1/1984 | Maxwell, III | B62K 25/02 301/110.5 |
| 5,862,890 A | 1/1999 | Long et al. | |
| 6,003,641 A | 12/1999 | Boehringer et al. | |
| 6,257,815 B1 * | 7/2001 | Nonaka | F16B 39/18 411/223 |
| 6,302,244 B1 | 10/2001 | Kernik et al. | |
| 2003/0184029 A1* | 10/2003 | McCurry | B23B 31/1253 279/902 |
| 2007/0052287 A1* | 3/2007 | White | F16C 25/06 301/132 |
| 2011/0261468 A1 | 10/2011 | Rieger et al. | |

(Continued)

FOREIGN PATENT DOCUMENTS

WO      2007030221      3/2007

OTHER PUBLICATIONS

European Patent Office, European Search Report dated Jul. 21, 2022 in Application No. 221611.3.

*Primary Examiner* — Scott A Browne
(74) *Attorney, Agent, or Firm* — SNELL & WILMER L.L.P.

(57) ABSTRACT

A wheel retaining assembly for a landing gear having an axle and an outer wheel bearing, the axle defining an axial direction along an axial centerline, is disclosed. In various embodiments, the wheel retaining assembly includes a first wheel spacer configured to slide over the axle and to abut the outer wheel bearing, the first wheel spacer having an axially outward portion; and a second wheel spacer configured to slide over the axle, the second wheel spacer having an axially inward portion configured to engage the axially outward portion of the first wheel spacer.

19 Claims, 5 Drawing Sheets

(56) References Cited

U.S. PATENT DOCUMENTS

2011/0291468 A1\* 12/2011 Rieger ............... B60B 27/0005
411/209
2020/0200209 A1 6/2020 Coyne et al.

\* cited by examiner

LANDING GEAR WHEEL RETENTION DEVICE

FIELD

The present disclosure relates generally to landing gear structures and, more particularly, to landing gear structures having wheel retention apparatus configured to separate side and drag load paths and to enable the use of in-axle towing.

BACKGROUND

Previous solutions for retaining a wheel to a landing gear axle do not isolate the side and drag loads reacted through a wheel retaining device when the aircraft is being operated or towed. This results in a combined loading scenario that may cause conventional wheel retention devices to fail through repeated exposure to adverse loading conditions.

SUMMARY

A wheel retaining assembly for a landing gear having an axle and an outer wheel bearing, the axle defining an axial direction along an axial centerline, is disclosed. In various embodiments, the wheel retaining assembly includes a first wheel spacer configured to slide over the axle and to abut the outer wheel bearing, the first wheel spacer having an axially outward portion; and a second wheel spacer configured to slide over the axle, the second wheel spacer having an axially inward portion configured to engage the axially outward portion of the first wheel spacer.

In various embodiments, the axially outward portion of the first wheel spacer includes a radially inner surface spaced a radial distance from a surface of the axle. In various embodiments, the axially inward portion of the second wheel spacer includes a radially inner surface configured to slidably engage the surface of the axle and a radially outer surface configured to threadedly engage the radially inner surface of the axially outward portion of the first wheel spacer. In various embodiments, the axle includes a channel at an axially outward end of the axle and the wheel retaining assembly further includes a lock ring configured to be received into the channel. In various embodiments, the second wheel spacer includes a recess disposed at an axially outward end of the second wheel spacer, the recess being configured to receive the lock ring into the recess.

In various embodiments, the second wheel spacer includes a base member extending radially outward from a radially outer surface of the second spacer and wherein the wheel retaining assembly further comprises a lock plate configured to engage the base member and to lock the first wheel spacer and the second wheel spacer in position with respect to the axle. In various embodiments, the lock plate includes a tab member configured to engage the first wheel spacer. In various embodiments, the first wheel spacer includes a pair of adjacent spokes extending radially outward from the first wheel spacer and configured to receive the tab member. In various embodiments, a bolt is included and configured to engage the lock plate to the second wheel spacer.

In various embodiments, the assembly further includes a radially extending flange, extending radially outward from an axially extending sleeve, the radially extending flange configured to receive and abut against a spray deflector flange. In various embodiments, an axle nut is included and configured to threadedly engage the axle and to urge the radially extending flange against the spray deflector flange.

A landing gear is disclosed. In various embodiments, the landing gear includes an axle having a radially outer surface; an inner bearing disposed on the axle and an outer bearing disposed on the axle, axially outward of the inner bearing; a wheel rotatably disposed on the inner bearing and the outer bearing; and a wheel retaining assembly configured to retain the wheel on the axle, the wheel retaining assembly comprising: a first wheel spacer configured to slide over the axle and to abut the outer wheel bearing, the first wheel spacer having an axially outward portion, a second wheel spacer configured to slide over the axle, the second wheel spacer having an axially inward portion configured to engage the axially outward portion of the first wheel spacer, and a lock plate configured to engage a base member extending radially outward from a radially outer surface of the second spacer and to lock the first wheel spacer and the second wheel spacer in position with respect to the axle.

In various embodiments, the lock plate includes a tab member configured to engage the first wheel spacer. In various embodiments, the first wheel spacer includes a pair of adjacent spokes extending radially outward from the first wheel spacer and configured to receive the tab member.

In various embodiments, the axially outward portion of the first wheel spacer includes a radially inner surface spaced a radial distance from the radially outer surface of the axle. In various embodiments, the axially inward portion of the second wheel spacer includes a radially inner surface configured to slidably engage the radially outer surface of the axle and a radially outer surface configured to threadedly engage the radially inner surface of the axially outward portion of the first wheel spacer.

In various embodiments, the landing gear further includes a radially extending flange, extending radially outward from an axially extending sleeve, the radially extending flange configured to receive and abut against a spray deflector flange. In various embodiments, an axle nut is configured to threadedly engage the axle and to urge the radially extending flange against the spray deflector flange.

In various embodiments, the axle includes a channel at an axially outward end of the axle and the wheel retaining assembly further comprises a lock ring configured to be received into the channel. In various embodiments, the second wheel spacer includes a recess disposed at an axially outward end of the second wheel spacer, the recess being configured to receive the lock ring into the recess.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
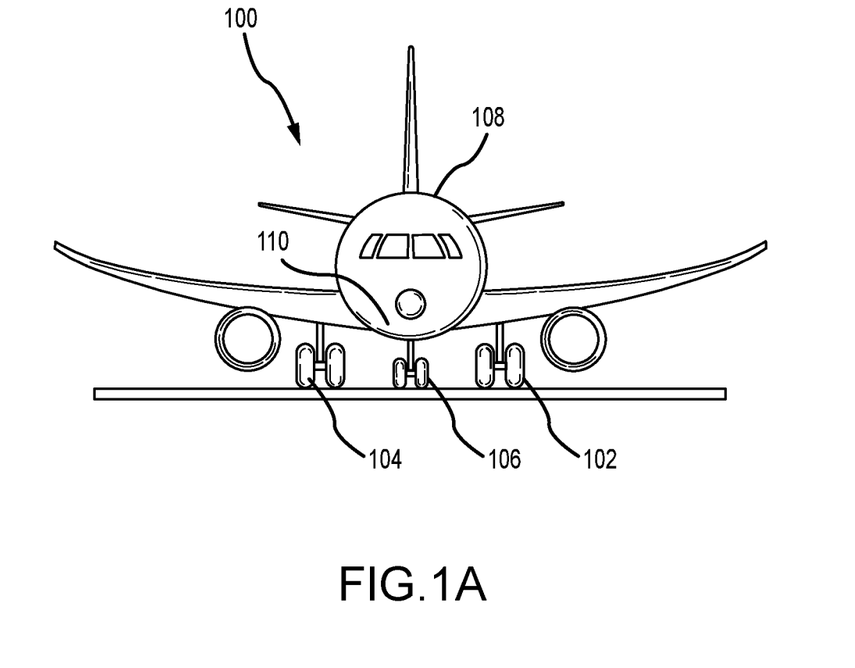
FIG. 1A illustrates a front view of an aircraft with the landing gear in a deployed position, in accordance with various embodiments.

With reference now to the drawings, FIG. 1A provides a front view of an aircraft 100 with a landing gear system in a deployed position. The landing gear system includes a first main landing gear 102 (or a port-side main landing gear), a second main landing gear 104 (or a starboard-side main landing gear) and a nose landing gear 106. The nose landing gear 106 is typically installed at a forward portion of a fuselage 108 (e.g., forward of the engines) of the aircraft 100—e.g., at a nose section 110 of the fuselage 108. The first main landing gear 102 and the second main landing gear 104 are typically installed aft of the nose landing gear 106. The first main landing gear 102, the second main landing gear 104 and the nose landing gear 106 are configured generally to support the aircraft when not flying, allowing the aircraft 100 to take off, land and taxi without sustaining damage to the aircraft 100.

Figure 1B:
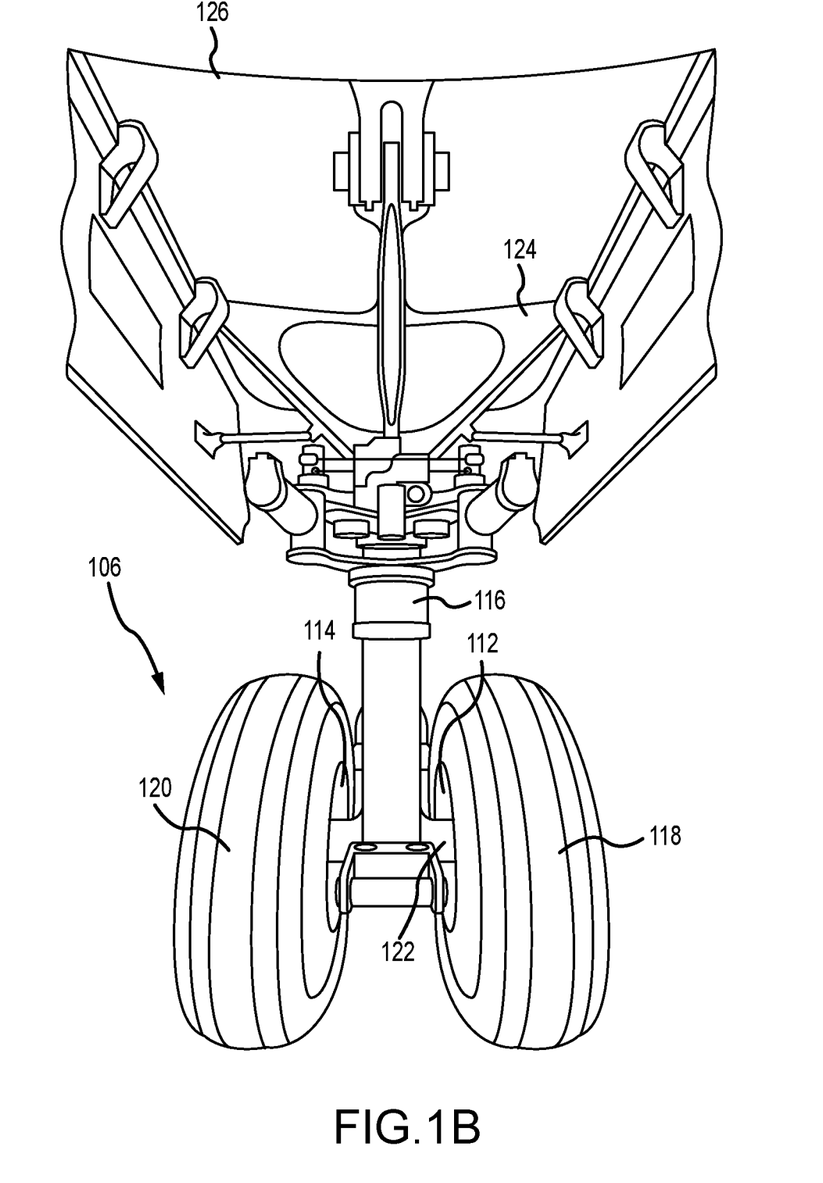
FIG. 1B illustrates a front view of a nose landing gear in the deployed position, in accordance with various embodiments.

In various embodiments, and with reference to FIG. 1B, the nose landing gear 106 may comprise a first wheel 112 and a second wheel 114 coupled to a landing gear strut 116. A first tire 118 is operatively coupled to (e.g., mounted on) the first wheel 112 and a second tire 120 is operatively coupled to the second wheel 114. The first wheel 112 and the second wheel 114 are operatively coupled to (e.g., rotatably disposed on) an axle assembly 122, which is connected to the landing gear strut 116. In turn, the landing gear strut 116 is connected via a support structure 124 and related apparatus configured to retract and deploy the nose landing gear 106 into and from, respectively, a nose landing gear bay 126.

Figure 2:
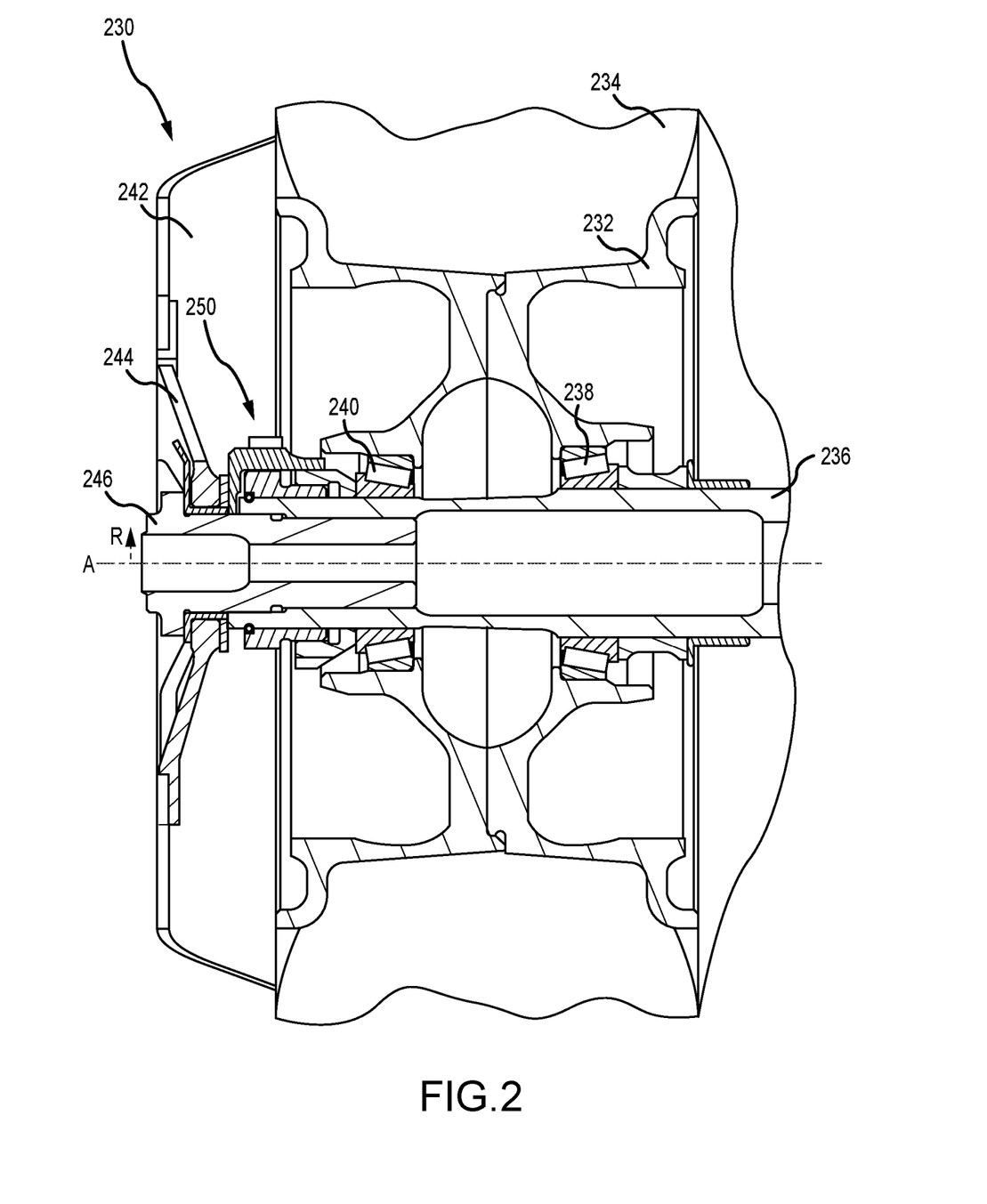
FIG. 2 illustrates a cross sectional view of a wheel assembly of a nose landing gear, in accordance with various embodiments.

Referring now to FIG. 2, a cross sectional view of a wheel assembly 230 of a nose landing gear, such as, for example, the nose landing gear 106 described above, is provided. As illustrated, the wheel assembly 230 includes a wheel 232 and a tire 234 mounted on the wheel 232. The wheel 232 is rotatably disposed on an axle 236 via an inner bearing 238 and an outer bearing 240, the axle defining an axial direction (A) along an axial centerline and a radial direction (R), with the outer bearing 240 being disposed on the axle 236 at a location axially outward of the inner bearing 238 and the inner bearing 238 being disposed on the axle 236 at a location axially inward of the outer bearing 240; as used throughout this disclosure, an axially outward component or portion of a component typically refers to a component or portion thereof being located or disposed farther along the axial centerline than an axially inward component or portion thereof. A wheel retaining assembly 250 (described in detail below with reference to FIGS. 3A and 3B) is mounted on the axle 236 and configured to abut the outer bearing 240, thereby maintaining the wheel 232 on the axle 236. In various embodiments, a spray deflector 242 is also mounted on the axle 236 via a spray deflector flange 244 and configured to prevent water or debris from contacting the aircraft fuselage when the wheel 232 and the tire 234 are rotating during takeoff, landing or taxiing. An axle nut 246 is threaded into an interior section of the axle 236 and functions, at least in part, to maintain the spray deflector 242 in place on the axle 236. As described further below, the axle nut 246 also provides a towing interface (e.g., via a towbar and a tug) for moving the aircraft to or from a gate or a hangar for maintenance.

Figure 3A:
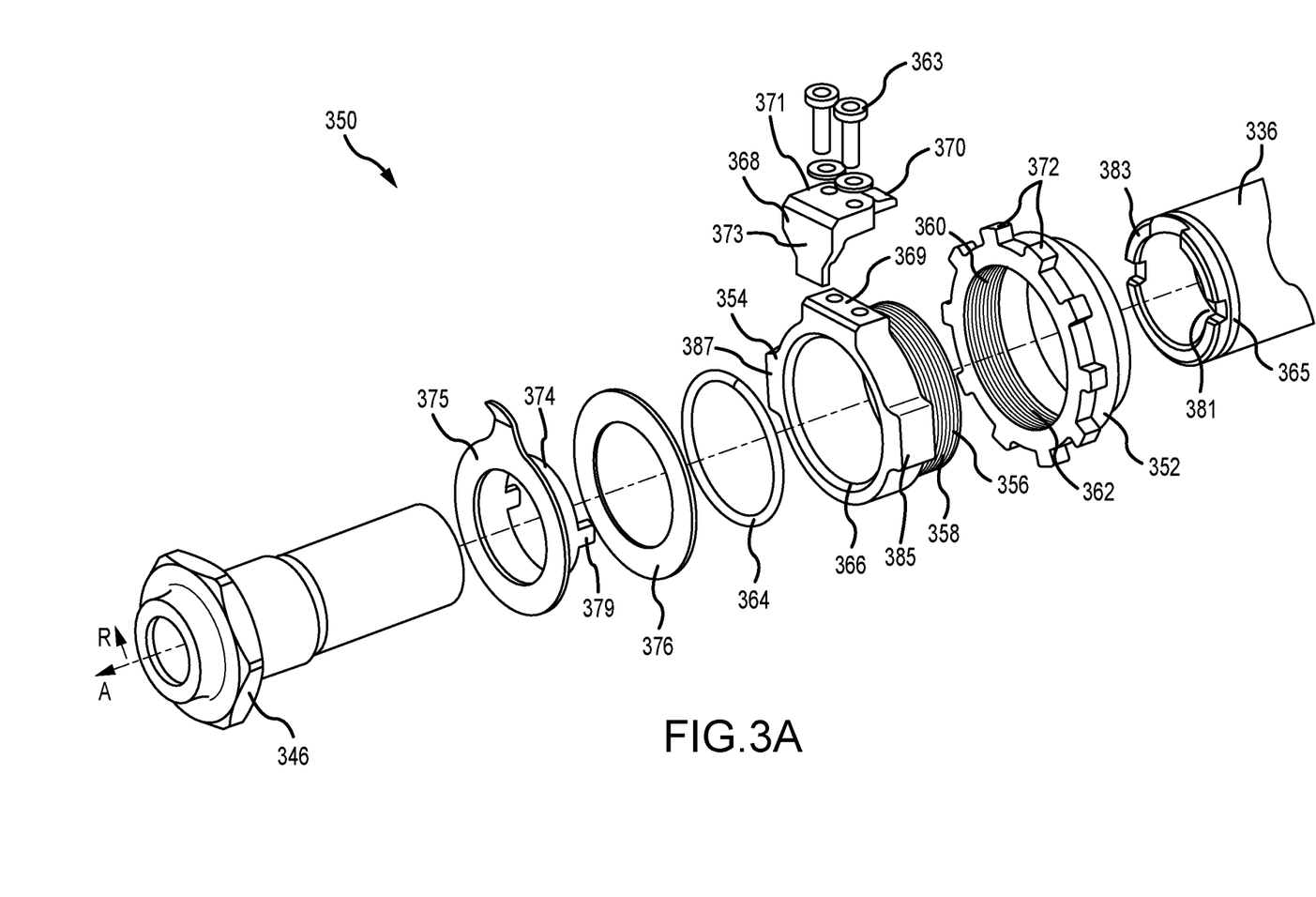
FIGS. 3A and 3B illustrate exploded and cross-sectional views of a wheel retaining assembly, in accordance with various embodiments.
Figure 3B:
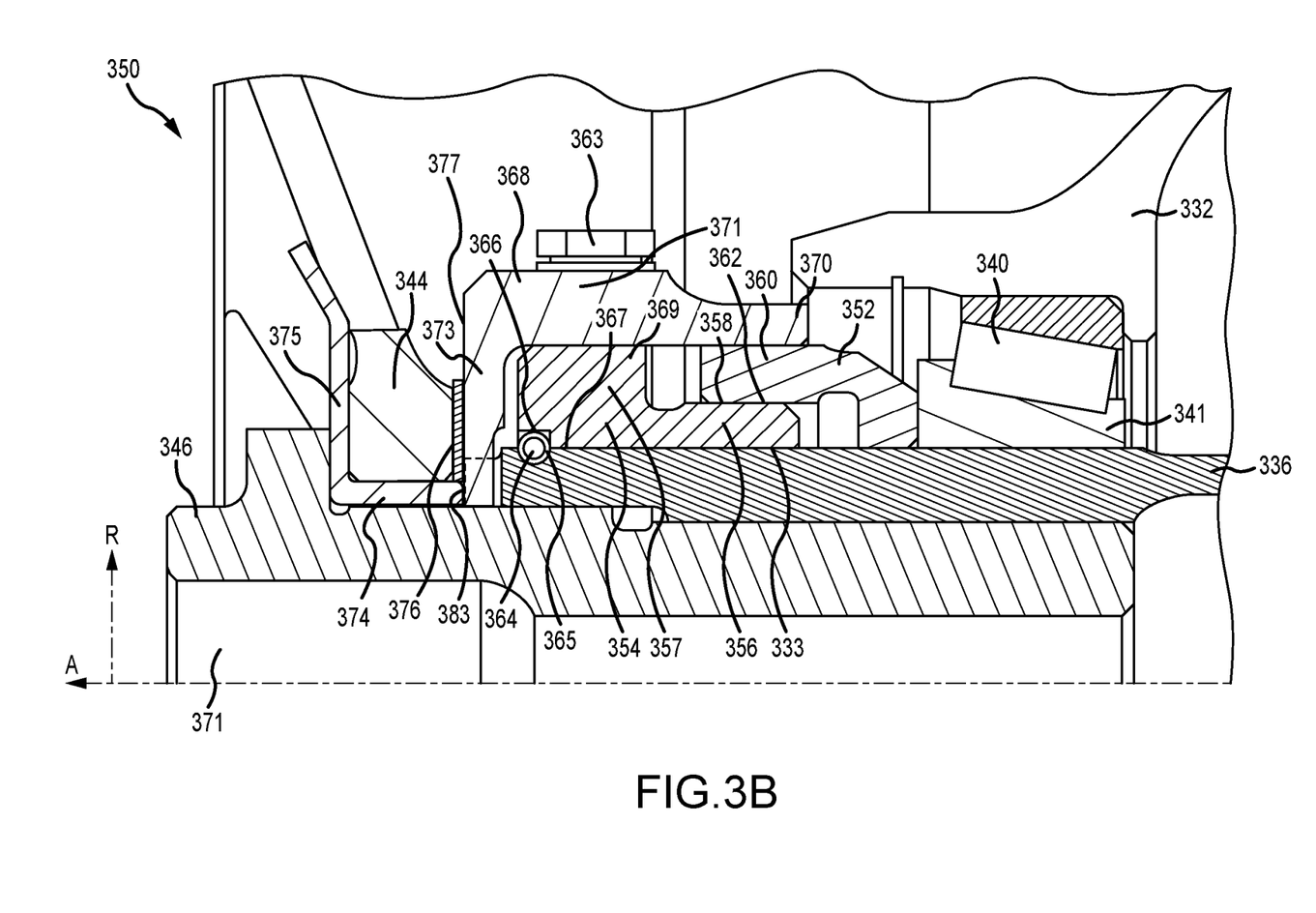

Referring now to FIGS. 3A and 3B, exploded and cross-sectional views of a wheel retaining assembly 350, similar to the wheel retaining assembly 250 described above, and related components, respectively, are provided with respect to an axial (A) and radial (R) coordinate system. In accordance with various embodiments, the wheel retaining assembly 350 includes a first wheel spacer 352 configured to slide over and slidably engage an axle 336, similar to the axle 236 described above, and to abut an outer wheel bearing 340 or, more particularly, a race 341 that is part of the outer wheel bearing 340. The wheel retaining assembly 350 further includes a second wheel spacer 354 that is also configured to slide over and slidably engage the axle 336. The second wheel spacer 354 includes an axially inward portion 356 and an axially outward portion 357, the axially inward portion 356 characterized as having a radially outer surface 358 (which is typically threaded) and a radially outer diameter, that is configured to engage (e.g., threadedly engage) an axially outward portion 360 of the first wheel spacer 352, characterized as having a radially inner surface 362 (which is typically threaded), spaced a radial distance from a surface or a radial outer surface 333 of the axle 336, and a radially inner diameter sized to match the radially outer diameter of the radially outer surface 358. So configured, and when assembled, the axially inward portion 356 of the second wheel spacer 354 threads into and fits tightly within the axially outward portion 360 of the first wheel spacer 352.

Still referring to FIGS. 3A and 3B, in various embodiments, the wheel retaining assembly 350 also includes a lock ring 364 configured to fit within a channel 365 cut into the axle 336 at an axially outward end of the axle 336 and a recess 366 that is cut into a radially inner surface 367 at an axially outward end of the second wheel spacer 354 (or at an axial outward end of the axially outward portion 357 of the second wheel spacer 354). The lock ring 364, together with the first wheel spacer 352 and the second wheel spacer 354, functions to retain the outer wheel bearing 340 and a wheel 332 rotatably mounted on the outer wheel bearing 340 in position on the axle 336. The wheel retaining assembly 350 further includes a lock plate 368 that is configured to lock the first wheel spacer 352 and the second wheel spacer 354 in position on the axle 336. As illustrated, the lock plate 368 is generally characterized as having a first plate portion 371 and a second plate portion 373, with the second plate portion 373 oriented at a substantially right angle to the first plate portion 371. In various embodiments, the lock plate 368 (or the first plate portion 371) is configured for engagement with a base member 369, extending radially outward of the second wheel spacer 354, via a bolt 363 (or a plurality of bolts or similar fasteners). In various embodiments, the lock plate 368 further includes a tab member 370 extending axially inward of the first plate portion 371 (when the wheel retaining assembly 350 is assembled) and configured to fit between a pair of adjacent spokes 372 extending radially outward of the first wheel spacer 352. When assembled, the lock plate 368 prevents the first wheel spacer 352 and the second wheel spacer 354 from rotating with respect to one another. Note that while the lock plate 368 is illustrated as a single unit in FIGS. 3A and 3B, the disclosure contemplates two or more lock plates, similar to the lock plate 368, being incorporated into the wheel retaining assembly 350, with such additional lock plates being disposed on, for example, a second base member 385 or a third base member 387 or even yet additional base members.

Referring still to FIGS. 3A and 3B, in various embodiments, the wheel retaining assembly 350 further includes an axially extending sleeve 374 having a flange 375 extending radially from the sleeve and configured to abut against an outward axial face of a spray deflector flange 344, similar to the spray deflector flange 244 described above with reference to FIG. 2. In various embodiments, the axially extending sleeve 374 is configured to abut an outward axial face 383 of the axle 336. Also included, in various embodiments, is a spacer 376 configured for positioning between an inward axial face of the spray deflector flange 344 and an outward axial face 377 of the lock plate 368. So configured, when the wheel retaining assembly 350 is assembled, the inward and outward axial faces of the spray deflector flange 344 are sandwiched between the radially extending flange 375 of the axially extending sleeve 374 and the spacer 376 (or the axial face 377 of the lock plate 368 if the spacer 376 is not included), thereby holding and locking the spray deflector flange 344 in place with respect to the axle 336. While the spacer is illustrated as being tightly positioned between the inward axial face of the spray deflector flange 344 and the outward axial face 377 of the lock plate 368, it is noted this configuration need not be used as an axial load path, allowing some tolerance or play to occur between the various axial faces just mentioned. As illustrated, the axially extending sleeve 374 further includes an axially extending tab 379 (or a plurality of such tabs) configured to mate with and engage a slot 381 (or a plurality of such slots) cut into the axially outward end of the axle 336, thereby locking the axially extending sleeve 374 in place with respect to the axle 336. In various embodiments, the wheel retaining assembly 350 includes an axle nut 346 similar to the axle nut 246 described above with reference to FIG. 2. The axle nut 346 includes threads that are configured to thread into complimentary threads on a radially inner surface of the axle 336. Once threaded into place and tightened, an inward axial face of the axle nut 346 abuts an outward axial face of the radially extending flange 375 of the axially extending sleeve 374, thereby compressing or locking the spray deflector flange 344 in place as described above. The axle nut 346 also includes a hollow interior 371 configured to receive a shaft of a towbar during a towing operation.

The foregoing disclosure provides a practical manner of securing a wheel to an axle. Various benefits of the disclosure include obviating the need for machined threads on the outer surface of the axle to secure structural components of wheel retaining assemblies to the axle. In addition, the disclosure provides a means to reduce or even separate side (or lateral) and drag (or aft) load paths experienced by the landing gear during operation or towing of the aircraft. In various embodiments, for example, the side load experienced by the wheel assembly will extend from the outer bearing and into the wheel retention assembly and will terminate at the lock ring, thereby preventing the side loads from extending into the axle nut and back into the axle via the axle nut. The disclosure also provides a more efficient manner of performing in-axle towing while reducing the various load paths described above. In addition, the disclosure enables auxiliary hardware, such as, for example, a spray deflector, to be attached or removed from the landing gear, for maintenance or replacement, without requiring disruption or disassembly of the wheel retention assembly. Note that while the disclosure focuses on a nose landing gear, the concepts described in the disclosure are applicable to wheels and landing gear in general, including main landing gear assemblies and wheels mounted on main landing gear assemblies.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A wheel retaining assembly for a landing gear having an axle and an outer wheel bearing, the axle defining an axial direction along an axial centerline, comprising:
   a first wheel spacer configured to slide over the axle and to abut the outer wheel bearing, the first wheel spacer having an axially outward portion; and
   a second wheel spacer configured to slide over the axle, the second wheel spacer having an axially inward portion configured to engage the axially outward portion of the first wheel spacer, wherein the axially inward portion of the second wheel spacer includes a radially inner surface configured to slidably engage a radially outer surface of the axle and a radially outer surface configured to threadedly engage the radially inner surface of the axially outward portion of the first wheel spacer.

2. The wheel retaining assembly of claim 1, wherein the axially outward portion of the first wheel spacer includes the radially inner surface spaced a radial distance from a surface of the axle.

3. The wheel retaining assembly of claim 2, wherein the axially inward portion of the second wheel spacer includes the radially inner surface configured to slidably engage the surface of the axle and the radially outer surface configured to threadedly engage the radially inner surface of the axially outward portion of the first wheel spacer.

4. The wheel retaining assembly of claim 3, wherein the axle includes a channel at an axially outward end of the axle and wherein the wheel retaining assembly further comprises a lock ring configured to be received into the channel.

5. The wheel retaining assembly of claim 4, wherein the second wheel spacer includes a recess disposed at an axially outward end of the second wheel spacer, the recess being configured to receive the lock ring into the recess.

6. The wheel retaining assembly of claim 1, wherein the second wheel spacer includes a base member extending radially outward from the radially outer surface of a second spacer and wherein the wheel retaining assembly further comprises a lock plate configured to engage the base member and to lock the first wheel spacer and the second wheel spacer in position with respect to the axle.

7. The wheel retaining assembly of claim 6, wherein the lock plate includes a tab member configured to engage the first wheel spacer.

8. The wheel retaining assembly of claim 7, wherein the first wheel spacer includes a pair of adjacent spokes extending radially outward from the first wheel spacer and configured to receive the tab member.

9. The wheel retaining assembly of claim 8, further comprising a bolt configured to engage the lock plate to the second wheel spacer.

10. The wheel retaining assembly of claim 9, further comprising a radially extending flange, extending radially outward from an axially extending sleeve, the radially extending flange configured to receive and abut against a spray deflector flange.

11. The wheel retaining assembly of claim 10, further comprising an axle nut configured to threadedly engage the axle and to urge the radially extending flange against the spray deflector flange.

12. A landing gear, comprising:
   an axle having a radially outer surface;
   an inner bearing disposed on the axle and an outer bearing disposed on the axle, axially outward of the inner bearing;
   a wheel rotatably disposed on the inner bearing and the outer bearing; and
   a wheel retaining assembly configured to retain the wheel on the axle, the wheel retaining assembly comprising:
      a first wheel spacer configured to slide over the axle and to abut an outer wheel bearing, the first wheel spacer having an axially outward portion,
      a second wheel spacer configured to slide over the axle, the second wheel spacer having an axially inward portion configured to engage the axially outward portion of the first wheel spacer, wherein the axially inward portion of the second wheel spacer includes a radially inner surface configured to slidably engage the radially outer surface of the axle and a radially outer surface configured to threadedly engage the radially inner surface of the axially outward portion of the first wheel spacer, and
      a lock plate configured to engage a base member extending radially outward from a radially outer surface of a second spacer and to lock the first wheel spacer and the second wheel spacer in position with respect to the axle.

13. The landing gear of claim 12, wherein the lock plate includes a tab member configured to engage the first wheel spacer.

14. The landing gear of claim 13, wherein the first wheel spacer includes a pair of adjacent spokes extending radially outward from the first wheel spacer and configured to receive the tab member.

15. The landing gear of claim 14, wherein the axially outward portion of the first wheel spacer includes the radially inner surface spaced a radial distance from the radially outer surface of the axle.

16. The landing gear of claim 15, further comprising a radially extending flange, extending radially outward from an axially extending sleeve, the radially extending flange configured to receive and abut against a spray deflector flange.

17. The landing gear of claim 16, further comprising an axle nut configured to threadedly engage the axle and to urge the radially extending flange against the spray deflector flange.

18. The landing gear of claim 17, wherein the axle includes a channel at an axially outward end of the axle and wherein the wheel retaining assembly further comprises a lock ring configured to be received into the channel.

19. The landing gear of claim 18, wherein the second wheel spacer includes a recess disposed at an axially outward end of the second wheel spacer, the recess being configured to receive the lock ring into the recess.

\* \* \* \* \*